United States Patent
Dockus et al.

(10) Patent No.: US 6,815,086 B2
(45) Date of Patent: Nov. 9, 2004

(54) METHODS FOR FLUXLESS BRAZING

(75) Inventors: Kostas F. Dockus, Cicero, IL (US); Robert H. Krueger, Spring Grove, IL (US); Brian E. Cheadle, Bramalea (CA); Mark S. Kozdras, Guelph (CA); Feng Liang, Oakville (CA)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 09/990,507

(22) Filed: Nov. 21, 2001

(65) Prior Publication Data

US 2003/0098338 A1 May 29, 2003

(51) Int. Cl.[7] ............................................. B32B 15/20
(52) U.S. Cl. ........................ 428/650; 428/652; 428/658
(58) Field of Search ................................. 428/650, 652, 428/658

(56) References Cited

U.S. PATENT DOCUMENTS

| | | | |
|---|---|---|---|
| 1,627,900 A | 5/1927 | Hewitson | |
| 2,142,564 A | 1/1939 | Korpium | |
| 2,745,799 A | 5/1956 | Patrie | |
| 2,821,014 A | 1/1958 | Miller | |
| 3,321,828 A | 5/1967 | Miller | |
| 3,332,517 A | 7/1967 | Voser | |
| 3,338,725 A | 8/1967 | Banks | |
| 3,417,005 A | 12/1968 | Baig | |
| 3,482,305 A | 12/1969 | Dockus | |
| 3,553,825 A | 1/1971 | Dockus | |
| 3,597,658 A | 8/1971 | Rivera | 317/234 R |
| 3,675,310 A | 7/1972 | Scheiner | 29/492 |
| 3,703,763 A | 11/1972 | Berry | |
| 3,843,333 A | 10/1974 | Woods | |
| 3,970,237 A | 7/1976 | Dockus | 228/208 |
| 4,028,200 A | 6/1977 | Dockus | |
| 4,164,454 A | 8/1979 | Schober | |
| 4,388,159 A | 6/1983 | Dockus | 204/33 |
| 4,489,140 A | 12/1984 | Pulliam | |
| 4,785,092 A | 11/1988 | Nanba et al. | |

(List continued on next page.)

FOREIGN PATENT DOCUMENTS

| | | |
|---|---|---|
| EP | 587307 B1 | 12/1996 |
| EP | 0605323 B1 | 5/2000 |
| EP | 0595601 B2 | 7/2001 |
| FR | 2617868 | 1/1989 |
| GB | 1087054 | 9/1964 |
| GB | 2270086 | 3/1984 |
| WO | WO 00/71784 A2 | 11/2000 |
| WO | WO0168312 | 9/2001 |
| WO | WO0188226 | 11/2001 |
| WO | WO0207928 | 1/2002 |
| WO | WO0238321 | 5/2002 |
| WO | WO0238326 | 5/2002 |

OTHER PUBLICATIONS

Research Disclosure 439070, anonymous disclosure, Kenneth Mason Publications Ltd, published Nov. 2000, pp. 1946 1947.*

(List continued on next page.)

Primary Examiner—John J. Zimmerman
(74) Attorney, Agent, or Firm—Howrey Simon Arnold & White, LLP

(57) ABSTRACT

A method of manufacturing an article of manufacture for use in a fluxless brazing process is disclosed. The method comprises the step of applying a braze-promoting layer including one or more metals selected from the group consisting of nickel, cobalt and iron, onto a bonding layer which comprises one or more metals selected from the group consisting of zinc, tin, lead, bismuth, nickel, antimony and thallium and which is disposed on a substrate including aluminum.

60 Claims, 5 Drawing Sheets

U.S. PATENT DOCUMENTS

| | | | |
|---|---|---|---|
| 4,826,736 A | 5/1989 | Nakamura | |
| 4,890,784 A | 1/1990 | Bampton | |
| 4,901,908 A | 2/1990 | Negura et al. | |
| 5,044,546 A | 9/1991 | De Clerck | |
| 5,069,980 A | 12/1991 | Namba et al. | |
| 5,072,789 A | 12/1991 | Usui et al. | |
| 5,100,048 A | 3/1992 | Timsit | |
| 5,232,788 A | 8/1993 | Timsit et al. | |
| 5,316,206 A | 5/1994 | Syslak | |
| 5,422,191 A | 6/1995 | Childree | |
| 5,464,146 A | 11/1995 | Zaluzec et al. | |
| 5,466,360 A | 11/1995 | Ehrsam | 205/170 |
| 5,894,054 A | 4/1999 | Paruchuri et al. | |
| 6,129,262 A | 10/2000 | Cooper et al. | |
| 6,379,818 B1 | 4/2002 | Mooij | 428/648 |
| 6,383,661 B2 | 5/2002 | Wittebrood | 428/650 |
| 6,391,476 B2 | 5/2002 | Wittebrood | 428/654 |
| 6,503,640 B2 | 1/2003 | Wittebrood | 428/654 |
| 6,568,584 B2 | 5/2003 | Wittebrood | 228/219 |
| 6,596,413 B2 * | 7/2003 | Wittebrood et al. | 428/652 |
| 6,599,645 B2 | 7/2003 | Wittebrood | |
| 2001/0040180 A1 * | 11/2001 | Wittebrood et al. | 228/219 |
| 2002/0012811 A1 * | 1/2002 | Wittebrood et al. | 428/652 |
| 2002/0050511 A1 | 5/2002 | Wittebrood | 228/247 |
| 2002/0086179 A1 | 7/2002 | Wittlebrood | |
| 2002/0088717 A1 | 7/2002 | Wittebrood | 205/259 |
| 2002/0139685 A1 | 10/2002 | Colombier et al. | 205/181 |
| 2002/0175205 A1 | 11/2002 | Wittebrood | 228/249 |
| 2003/0042146 A1 | 3/2003 | Wijonberg | 205/210 |
| 2003/0064242 A1 | 4/2003 | Wittebrood | 428/652 |
| 2003/0091856 A1 | 5/2003 | Wittebrood | 428/654 |
| 2003/0189082 A1 | 10/2003 | Dockus | |

OTHER PUBLICATIONS

Preparation of and Electroplating on Aluminum Alloys by the Zincate Process—American National Standard Institute, Aug. 19, 1974.

B. E. Cheadle and K. F. Dockus, International Congress and Exposition, Detroit, Michigan, Feb. 29–Mar. 4, 1988 SAE Technical Paper Series—Inert Atmosphere Fluxless Brazing of Aluminum Heat Exchangers.

Wernick et al., The Surface Treatment and Finishing of Aluminium and its Alloy, Fifth Edition, vol. 1, 1987, pp. iii–v; xxx–xxxi; 180–183; 190–203.

Durney, Electroplating Engineering Handbook, Fourth Edition, 1984, pp. 185–188; 245; 247–250.

Engstrom et al., A Multilayer Clad Aluminum Material with Improved Brazing Properties, 1988, pp. 222–226.

Wernick et al., The Surface Treatment and Finishing of Aluminum and its Alloys, Fifth Edition, vol. 2, 1987, pp. 1023–1083.

Metal Progress, Mid–Jun. DATABOOK 1980, Properties and Applications of Wrought Aluminum Alloys, pp. 56–57.

Designation: B 253–87 (Reapproved 1993), Standard Guide for Preparation of Aluminum Alloys for Electroplating, pp. 48–54.

Van Horn, Aluminum, vol. 1, Properties, Physical Metallurgy and Phase Diagrams, 1987, pp. v; 48–55; 162–165; 178–179; 192–209; 300–303.

Aluminum Standards and Data 1997, The Aluminum Association, 1996, pp. 6–1 –6–6.

Designation: B 253–73, Standard Recommended Practice for Preparation of and Electroplating on Aluminum Alloys by the Zincate Process, 1974, pp. 72–81.

Lentz et al., Aluminum Brazing Handbook, Third Edition, 1979, pp. 5–6; 8; 24–33; 36; 58–61; 65–66.

Aluminum Standards and Data 1984, pp. 1–2; 7; 15–21; 29–30.

Wyszynski, An Immersion Alloy Pretreatment for Electroplating on Aluminium, Transactions of the Institute of Metal Finishing, 1967, vol. 45, pp. 147–154.

The Coil which Goes Around the World Technical Date (no date).

Golby et al., Factors Influencing the Growth of Zinc Immersion Deposits on Aluminum Alloys, Transactions of the Institute of Metal Finishing, 1981, vol. 59, pp. 17–24.

Pearson et al., Improvements in the Pretreatment of Aluminum as a Substrate for Electrodeposition, Trans IMF, 1997, 75(3), pp. 93–97.

Such et al., An Improvement in Zincate Method for Plating on Aluminum, 1965, pp. 1027–1034.

Metals & Alloys in the Unified Numbering System. Seventh Edition, 1996, pp. 31–35; 42; 44.

Finstock and Brazing Products for Heat Exchanger Applications, Alcan (no date).

Wyszynski, Electrodeposition on Aluminium Alloys, Transactions of the Institute of Metal Finishing, 1980, vol. 58, pp. 34–40.

Golby et al., A Study of the Effect of Pretreatment Procedures on the Plating of Aluminium Alloys, Surface Technology, 12, (1981) 141–155.

* cited by examiner

METHODS FOR FLUXLESS BRAZING

FIELD OF THE INVENTION

The present invention relates to improved methods for fluxless brazing. Particularly, the invention relates to techniques for conditioning or plating the surface of an aluminum substrate so as to improve its ability to receive a braze-promoting layer and uses for such conditioned substrates.

BACKGROUND OF THE INVENTION

Various methods of bonding aluminum are known in the prior art. In the context of heat exchanger assemblies, which are characterized by thin aluminum components, bonding has heretofore commonly been effected in the prior art by furnace brazing, most commonly, by Controlled Atmosphere Brazing (CAB) flux and Vacuum Brazing (VB).

In Vacuum Brazing, the parts to be brazed are provided with sufficient quantities of magnesium, normally by providing Mg alloy constituents in the filler metal or in the aluminum components, such that, when brought to temperature in a brazing furnace under sufficient vacuum conditions, the magnesium becomes sufficiently volatile to disrupt the oxide layer present and permit the underlying aluminum filler metal to flow together. While this technique provides for good bonding, it is essentially a discontinuous process, resultant from the need to apply a vacuum, and thus, is relatively expensive. It is also difficult to control, as it is very sensitive to oxidizing conditions in the furnace atmosphere, and demands that onerous standards of material cleanliness be maintained. Further, the evaporation of the magnesium leads to condensation in the brazing furnace, which requires frequent removal, thereby further adding to costs.

In Controlled Atmosphere Brazing, the ability to braze does not result from mechanical disruption of the oxide but rather, from chemical modification of the oxide by a fluoride salt flux which is applied to the parts. As the name suggests, CAB brazing does not require that a vacuum be drawn, such that the process may readily be carried out on a continuous basis, most typically using an inert gas furnace. While this provides for some reduction in cost, this cost saving is partially offset by the necessity for integration of fluxing systems, many of which will suffer from variable flux loading. Moreover, after the flux has been applied, the flux can be susceptible to flaking, such that contamination of the article of manufacture can occur. The flux can also be difficult to apply, especially on internal joints; can cause problems in terms of furnace corrosion and cleanliness in the finished product. More importantly however, it has been found that the flux can lose activity when exposed to magnesium. Thus, this process is not suitable for brazing magnesium-enriched aluminum alloys. As magnesium is a commonly used alloying element in aluminum to improve, inter alia, strength, this reduces the attractiveness of CAB brazing.

An alternative method of bonding aluminum is described in U.S. Pat. No. 3,482,305. In this method, a bond-promoting metal of cobalt, iron, or, more preferably, nickel, is coated on a part to be brazed, in a manner more fully described in U.S. Pat. No. 4,028,200. If properly applied, the nickel reacts exothermically with the underlying aluminum-silicon (7–12%) alloy, thereby presumably disrupting the aluminum oxide layer, and permitting the underlying aluminum metal to flow together and join. Vacuum conditions are not required, such that this method overcomes the limitations of VB. Further, as this method does not require a fluoride flux, it is suitable for utilization with magnesium-enriched aluminum alloys, such as are beneficially utilized in heat exchanger construction, and thus, overcomes the drawbacks of CAB. As additional benefits, this process has utility in association with a wide variety of aluminum alloys. However, the bath described in U.S. Pat. No. 4,028,200 is taught to be useful only in the context of parts previously conditioned by caustic etching; provides for relatively slow plating; and has a relatively limited useful life, thereby resulting in significant cost.

Other mechanisms are known in the plating industry as being capable of providing the deposit of nickel upon aluminum. One very popular electroplating bath is the Watts bath, which is known to have some utility in plating decorative nickel on aluminum substrates, provided a surface pretreatment is first carried out. Preferably, a zincate layer is first applied, followed by a thin copper plate (eg. Rochelle-type copper cyanide strike solution) or a thin nickel plate (eg. neutral nickel strike, nickel glycolate strike), followed by the Watts bath. However, these preplate steps add cost, and in the case of copper, have deleterious environmental aspects, resultant from the use of cyanide. Copper has a further disadvantage in that it can negatively affect the corrosion resistance of aluminum products. Although it is possible to plate nickel directly on the zincate layer, the Watts bath is difficult to control in these circumstances, such that satisfactory adhesion or coverage of nickel is not always obtained. Further, addition of lead to the Watts bath reduces its plating rate, yet further limiting the attractiveness of the Watts bath, given the known benefits associated with the inclusion of lead in the nickel deposit.

SUMMARY OF THE INVENTION

According to one aspect, the invention comprises a method of manufacturing an article of manufacture for use in a fluxless brazing process, the method including the step of applying a braze-promoting layer including one or more metals selected from the group consisting of nickel, cobalt and iron, onto a bonding layer which includes one or more metals selected from the group consisting of zinc, tin, lead, bismuth, nickel, antimony and thallium and which is disposed on a substrate comprising aluminum, the junction of the bonding layer and substrate defining a target surface of the substrate.

According to another aspect, the invention comprises a method of manufacturing an article of manufacture for use in an improved fluxless brazing process, the method including the step of plating a braze-promoting layer including one or more metals selected from the group consisting of nickel and cobalt, onto a substrate including aluminum, the junction of the braze-promoting layer and the substrate defining a target surface of the substrate, wherein the application of the braze-promoting layer is preceded by mechanical abrasion of the substrate such that the target surface defines a plurality of reentrant edges.

According to a further aspect, the invention comprises a method of manufacturing an article of manufacture for use in a fluxless brazing process, the method including the step of electroplating a braze-promoting layer including one or more metals selected from the group consisting of nickel or cobalt, onto a substrate including aluminum, wherein the electroplating is carried out in an aqueous bath having a pH of from about 5 to 7 and including, in solution, said one or more metals.

According to a yet further aspect, the invention comprises a method of manufacturing an article of manufacture for use in a fluxless brazing process, the method including the step of plating a braze-promoting layer including nickel onto a substrate including aluminum, wherein the plating is carried out in an aqueous bath consisting of an aqueous solution of: from about 3 to about 20 weight percent of nickel sulfate; from about 3 to about 10 weight percent of nickel chloride; from about 6 to about 30 weight percent of a buffering salt selected from the group consisting of sodium citrate and sodium glyconate; from about 0.005 to about 1.0 weight percent of a lead salt selected from the group consisting of lead acetate and lead citrate; and ammonium, wherein the bath has a pH value in the range of about 3 to 12 and has a mole ratio of nickel:citrate:ammonium in solution of about 1:0.5–1.5:1–6.

According to yet another aspect, the invention comprises a method of manufacturing an article of manufacture for use in a fluxless brazing process, the method including the step of plating a braze-promoting layer including nickel onto a substrate including aluminum, wherein the electroplating is carried out in an aqueous bath consisting of an aqueous solution of nickel, citrate and ammonium, wherein the plating bath has a pH value in the range of about 5 to 12 and has a mole ratio of nickel:citrate:ammonium in solution of about 1:0.5–1.5:1–6.

According to still yet another aspect, the invention comprises an article of manufacture for use in an improved fluxless brazing process, including a substrate including aluminum; a bonding layer on the substrate which comprises one or more metals selected from the group consisting of zinc, tin, lead, bismuth, nickel, antimony and thallium; and a braze-promoting layer on the bonding layer including one or more metals selected from the group consisting of nickel, cobalt and iron.

Other advantages, features and characteristics of the present invention, will become more apparent upon consideration of the following detailed description with reference to the accompanying drawings, the latter of which is briefly described hereinbelow.

DETAILED DESCRIPTION

Figure 1:
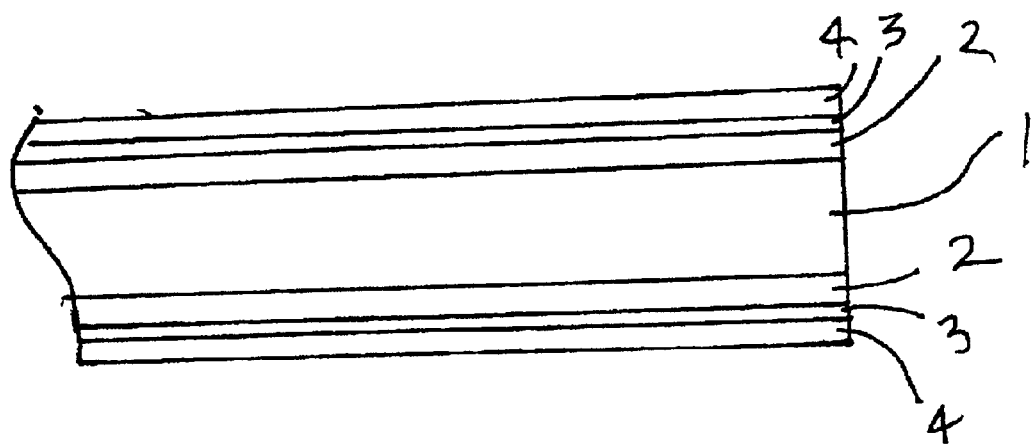
FIG. 1 shows schematically a brazing sheet in accordance with a first preferred embodiment of the present invention.

The present invention will hereinafter be described.

As indicated earlier, the invention comprises improved methods for bonding aluminum based upon the teachings set out in U.S. Pat. No. 4,028,200, wherein it is taught that nickel and aluminum undergo an exothermic reaction at brazing temperatures [approx. 1050° F.] which permits brazing to occur. Cobalt and iron are also taught to be suitable substituents, in whole or in part, for nickel in this process, and that lead and/or bismuth are useful adjuvants.

The invention comprises the step of conditioning the surface of an aluminum substrate so as to improve its ability to receive a braze-promoting layer of a metal such as nickel or cobalt, which metals are known to be difficult to plate directly on aluminum in a manner which preserves their ability to undergo exothermic reaction as discussed above.

In one aspect, the conditioning comprises the application of a bonding layer which comprises one or more metals selected from the group consisting of zinc, tin, lead, bismuth, nickel, antimony and thallium and which is disposed on an aluminum substrate. Provided the bonding layer is maintained at minimum levels of thickness, it has been found that the presence of these latter metals does not interfere with the aforementioned exothermic reaction between aluminum and nickel [the bonding layer of nickel, of course, reacts along with the braze-promoting layer, with the aluminum]. [It is noted that thallium is toxic, and as such, is preferably not utilized.]

Braze tests were carried out to demonstrate the foregoing. In each test, braze quality was determined by placing the flat, cut end of a 3003 O-temper aluminum tube [0.65" I.D.× 0.75" O.D., cut to 0.5" length and ground flat] on a 2"×3" coupon of No. 12 brazing sheet [total thickness 0.020", core 3003 aluminum, clad on both sides with nominal 10% ie 0.002" AA4343 aluminum (7.5% silicon)] and heating the arrangement in a preheated furnace in a flowing nitrogen atmosphere to 1100° F. for a dwell time of less than 1 minute at maximum temperature. Braze quality was recorded as excellent, good, fair or poor, based on visual attribute data such as fillet size, wetting characteristics, surface appearance, lustre, etc.

EXAMPLE 1

As a control, a brazing sheet coupon was immersed in 10 wt. % Oakite 360 etch solution at ambient temperature for 45 seconds; tap water rinsed; deoxidized in 4% Oakite Deox PD-60-FC 22 for 7 seconds; tap water rinsed; and immersed for 30 seconds in an alkaline zincate solution including 50% sodium hydroxide and 100 g/l zinc oxide to form a uniform zinc coating of approximately 0.2 $\mu$m. The AA3003 tube was not treated prior to arrangement on the coupon. Upon heating, poor brazing (no braze) was observed. A similar test was carried out in relation to a coupon immersed in zincate solution for 60 seconds to form a uniform zinc coating of approximately 0.2 $\mu$m. Again, poor brazing (no braze) was observed, which substantiates the need for a braze-promoting layer.

EXAMPLE 2

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; tap water rinsed; and nickel plated in a traditional Watts bath including 200 g/l $NiSO_4.6H_2O$, 40 g/l $NiCl_2.6H_2O$, 30 g/l $H_3BO_3$ [pH 4.8–5.2, ambient temperature] at 30 mA/cm$^2$ for 60–90 seconds. The tube was not treated prior to arrangement on the coupon. A fair to good braze was observed.

EXAMPLE 3

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; tap water rinsed; and nickel plated in a modified Watts bath including 150 g/l $NiSO_4.6H_2O$, 30 g/l $NH_4Cl$, 30 g/l $H_3BO_3$ [pH 4.8–5.2, by concentrated H2SO4, ambient temperature] at 50 $mA/cm^2$ for 60–90 seconds. The tube was not treated prior to arrangement on the coupon. A good braze was observed.

EXAMPLE 4

The coupon was immersed for 30 seconds in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; tap water rinsed; and nickel plated in a modified Watts bath including 150 g/l $NiSO_4.6H_2O$, 30 g/l $NH_4Cl$, 30 g/l sodium citrate, 30 g/l $H_3BO_3$, [pH 4.8–5.2, by concentrated $H_2SO_4$, ambient temperature] at 50 $mA/cm^2$ for 60–90 seconds. The tube was not treated prior to arrangement on the coupon. A good to excellent braze was observed.

EXAMPLE 5

The coupon was immersed for 2 minutes in a tinning solution [170° F.] including 45 g/l sodium stannate, 7.5 g/l sodium acetate; then nickel-lead plated in an alkaline bath including 70 g/l $NiSO_4.6H_2O$, 30 g/l $NiCl_2.6H_2O$, 120 g/l sodium citrate, 20 $\mu$l sodium acetate, 15 g/l $(NH_4)_2SO_4$, 1.2 g/l lead acetate [pH 8.2, by 18 Be $NH_4OH$] at 30 $mA/cm^2$ for 2 minutes. The tube was not treated prior to arrangement on the coupon. An excellent braze was observed.

EXAMPLE 6

The coupon was etched in 10 wt. % Oakite 360 solution at ambient temperature for 45 seconds; tap water rinsed; deoxidized in 4% Oakite Deox PD-60-FC-22 for 7 seconds; tap water rinsed; coated to a uniform lead coating by immersion for 10 seconds in a solution including 50 g/l ZnO, 10 g/l PbCO3, 250 g/l NaOH, 3.5 g/l tartaric acid, 0.44 g/l FeCl3 and approx. 10 g/l EDTA; and nickel plated in an alkaline bath including 70 $\mu$l $NiSO_4.6H_2O$, 30 g/l $NiCl_2.6H_2O$, 120 g/l sodium citrate, 20 g/l sodium acetate, 15 g/l $(NH_4)_2SO_4$, [pH 8.2, by 18 Be $NH_4OH$] at 60 $mA/cm^2$ for 60 seconds at ambient temperature. The tube was not treated prior to arrangement on the coupon. An excellent braze was observed. Similar test were carried out in relation to a coupons immersed in lead solution for 20 and 30 seconds, respectively. Again, excellent brazing joints were observed.

EXAMPLE 7

The coupon was immersed for 30 seconds in a solution [ambient temperature] including 1.25% sodium hydroxide, 0.125% sodium gluconate and 1.0% lead acetate; and nickel plated in a Watts bath [pH 3.8] including 262 g/l nickel sulphate, 45 g/l nickel chloride, 30 g/l boric acid at 25.5 $mA/cm^2$ for 2 minutes to a thickness of 0.82 um. The tube was not treated prior to arrangement on the coupon. An excellent braze was observed.

EXAMPLE 8

The coupon was cleaned by immersion for 45 seconds in a solution containing 10% caustic, 1% sodium gluconate; tap water rinsed; immersed for 20 seconds in an ambient solution including 62.5 g/l sodium hydroxide, 1 $\mu$l sodium gluconate, 0.6 g/l bismuth $Bi_2O_3$; tap water rinsed; nickel plated in a 35C alkaline bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, [pH 8.2, by 18 Be $NH_4OH$] at 25.5 $mA/cm^2$ for 120 seconds. The tube was not treated prior to arrangement on the coupon. A good braze was observed.

EXAMPLE 9

The coupon was cleaned by immersion for 45 seconds in a solution containing 10% caustic, 1% sodium gluconate; tap water rinsed; immersed for 20 seconds in an ambient solution including 250 g/l sodium hydroxide, 4 g/l sodium gluconate, 2.5 g/l $Bi_2O_3$; tap water rinsed; nickel plated in a 35C alkaline bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, [pH 8.2, by 18 Be $NH_4OH$] at 25.5 $mA/cm^2$ for 120 seconds. The tube was not treated prior to arrangement on the coupon. An excellent braze was observed.

Figure 2:
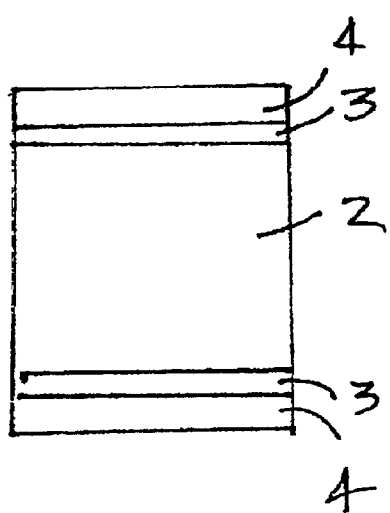
FIG. 2 shows schematically a brazing shim in accordance with a second preferred embodiment of the present invention.
Figure 3:
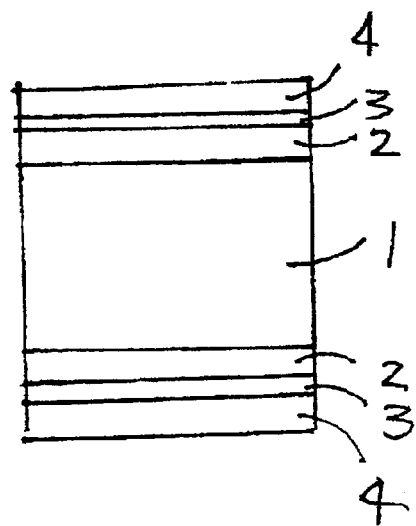
FIG. 3 shows schematically a brazing shim in accordance with a third preferred embodiment of the invention.

This method can be embodied in various articles of manufacture, such as a brazing preform, ie. a substrate of brazing alloy [aluminum having alloying agents so as to have a lower melting point than the aluminum components which are intended to be brazed. Typical alloying agents include silicon, present at 2–18 wt. %, zinc, and magnesium, and combinations thereof, such as aluminum-magnesium-silicon, aluminum-zinc-silicon and aluminum-magnesium-silicon-zinc] formed in a wire, rod or sheet form and coated with the bonding layer and thence with braze-promoting layer, which may be interposed between aluminum parts formed of unclad aluminum, for subsequent brazing. Exemplary brazing preforms are shown schematically: in FIG. 2, a substrate of brazing alloy 2 is interposed between bonding layers 3 and braze-promoting layers 4. In FIG. 3, a core 1 is interposed between layers of brazing alloy 2, which in turn, is interposed between bonding layers 3 and braze-promoting layers 4.

The usefulness of such preforms is made evident with reference to the following examples:

EXAMPLE 10

An untreated 0.004" substrate of 4047 alloy (12% silicon) was interposed between a coupon of AA3003 sheet and a tube of O-temper 3003 tube, and the arrangement was placed in a preheated furnace and heated in a nitrogen atmosphere to 1100° F., dwell time of less than 1 minute. No braze was observed.

EXAMPLE 11

A substrate as per Example 10 was immersed for 30 seconds in a zincating solution [ambient temperature] including 120 $\mu$l sodium hydroxide, 20 g/l zinc oxide, 50 g/l Rochelle salt, 2 g/l ferric chloride hexahydrate and 1 $\mu$l sodium nitrate; nickel plated in a 35C alkaline bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, 1.2 g/l lead acetate [pH 8.2, by 18 Be $NH_4OH$] at 30 $mA/cm^2$ for 120 seconds. The tube was not treated prior to arrangement on the coupon. Good brazing was observed.

It has also unexpectedly been found that the brazing preform can be used to braze aluminum to aluminum or to any aluminized metal; nickel-coated titanium or steel or stainless steel to aluminum or to any aluminized metal; and nickel-coated titanium or steel or stainless steel to nickel-coated titanium or steel or stainless steel.

However, more commonly, as schematically illustrated in FIG. 1, the method will be embodied in a brazing sheet product having a brazing sheet substrate, comprising an aluminum core 1 and a clad layer of brazing alloy 2; a bonding layer 3 on the clad layer 2, and a braze-promoting layer 4 on the bonding layer, which may be formed into a useful shape and brazed with similar objects. The usefulness of such brazing sheet product will be made evident with reference to the examples which follow.

EXAMPLE 12

For experimental convenience, plates for an engine oil cooler were initially stamped from 0.028" #12 brazing sheet; immersed in a zincating solution [ambient temperature] including 120 g/l sodium hydroxide, 20 g/l zinc oxide, 50 g/l Rochelle salt, 2 g/l ferric chloride hexahydrate and 1 g/l sodium nitrate to form a uniform zinc coating; and nickel plated in a solution including 142 g/l nickel sulphate, 43 g/l ammonium sulphate, 30 g/l nickel chloride, 140 g/l sodium citrate and bismuth [$Bi_2O_3$ was dissolved in HCl and pipetted into bath—approximates 1–2 g/l of the soluble bismuth salt] at 65 mA/cm$^2$ at for 90 s. Excellent brazing results were observed.

EXAMPLE 13

0.028" brazing sheet [modified 3005, clad on both sides with 4045+0.2% Mg] was immersed for 45 seconds in Heat Bath ZA-3-9 commercial zincating solution; tap water rinsed; dried; recoiled; and nickel plated in a 35C alkaline bath including 70 g/l $NiSO_4.6H_2O$, 30 g/l $NiCl_2.6H_2O$, 120 g/l sodium citrate, 20 g/l sodium acetate, 15 g/l $(NH_4)_2SO_4$, 1.2 g/l lead acetate [pH 8.2, by 18 Be $NH_4OH$] at 25 mA/cm$^2$ for 120 seconds. Components for a transmission oil cooler were stamped, assembled and brazed under production conditions which involved a braze cycle similar to that described in Examples 1–11. An excellent braze was observed. Experimental testing established that, once zinc plated, the coil could be stored for a reasonable time period and then nickel plated without adverse effect.

While it is possible that substrates of a type suitable for direct deposition of the braze-promoting layer, that is, including core, clad and bonding layers, is now or will at some point be made commercially available, the method, of course, encompasses the preliminary step of applying the bonding layer on a "target" surface of a substrate, such as the surface of a conventional brazing sheet. Similarly, whereas in the normal course, it will be most economical to coat the braze-promoting layer, and if necessary, the bonding layer, upon brazing sheet in a continuous process using brazing sheet in roll form, it is contemplated that one or more of such coating steps could follow after the brazing sheet has been formed into objects to be rendered brazeable. This might be useful, for example, in circumstances wherein drastic mechanical deformation of the brazing sheet was required to form a part, and it was critical that a braze joint could be produced at the exact point of deformation; in such circumstances, a risk of delamination or cracking of the plating so as to increase the risk of oxidation of the coatings at the deformation point would exist, and so as to avoid the need to stress the performance characteristics of the process to ensure good adhesion even through such drastic deformation, it might be more economical to simply carry out the coating steps thereafter. It is also conceivable that the coating step could follow forming in circumstances wherein the additional materials handling costs (ie of coating each individual part as compared to continuous roll coating) were outweighed by the cost savings to be gained through reductions in coating material utilization, for example, in circumstances wherein by virtue of the shape of the parts, a great amount of waste metal is produced during stamping (which waste metal would otherwise have needlessly been coated).

The bonding layer may be applied in any one (or more) of a variety of conventional application steps which are obvious to persons of ordinary skill in the plating arts, and accordingly, are not herein described in detail. However, it has been unexpectedly found that if the method is extended such that the application of the bonding layer is preceded by a mechanical abrasion of the substrate, preferably, by brush cleaning the surface using commercially available flap brushes comprising nylon fibres impregnated with suitable ceramic particulates, or stainless steel brushes, such that the target surface defines a plurality of reentrant edges, it is possible to significantly increase the plating rate, as evidenced by the examples which follow.

EXAMPLE 14

A coupon as per Examples 1–11 was mechanically abraded using a stainless steel brush; immersed in a zincating solution [ambient temperature] including 120 g/l sodium hydroxide, 20 µl zinc oxide, 50 g/l Rochelle salt, 2 g/l ferric chloride hexahydrate and 1 µl sodium nitrate for 15–20 seconds to form a uniform zinc coating; and nickel plated in a 35C alkaline bath including 70 g/l $NiSO_4.6H_2O$, 30 g/l $NiCl_2.6H_2O$, 120 µl sodium citrate, 20 g/l sodium acetate, 15 g/l $(NH_4)_2SO_4$, 1.2 g/l lead acetate [pH 8.2, by 18 Be $NH_4OH$] at 25 mA/cm$^2$ for 60 seconds. An excellent brazing joint was observed.

EXAMPLE 15

A series of coupons as per Example 14 were zincated as per Example 14 in the absence of a mechanical abrasion or any other surface treatment, to determine the equivalent time needed to achieve the same uniform zinc coverage. A uniform zinc coating was not observed until 30 seconds had elapsed.

As an aside, and as another aspect of the invention, it has also been unexpectedly found that the aforementioned mechanical abrasion step conditions the surface of an aluminum substrate so as to improve its ability to directly receive a braze-promoting layer of a metal such as nickel or cobalt as deposited, inter alia, through the process described in U.S. Pat. No. 4,028,200.

Figure 4:
FIG. 4 is an SEM image of the surface of a brazing sheet subsequent to brush cleaning and nickel plating.
Figure 5:
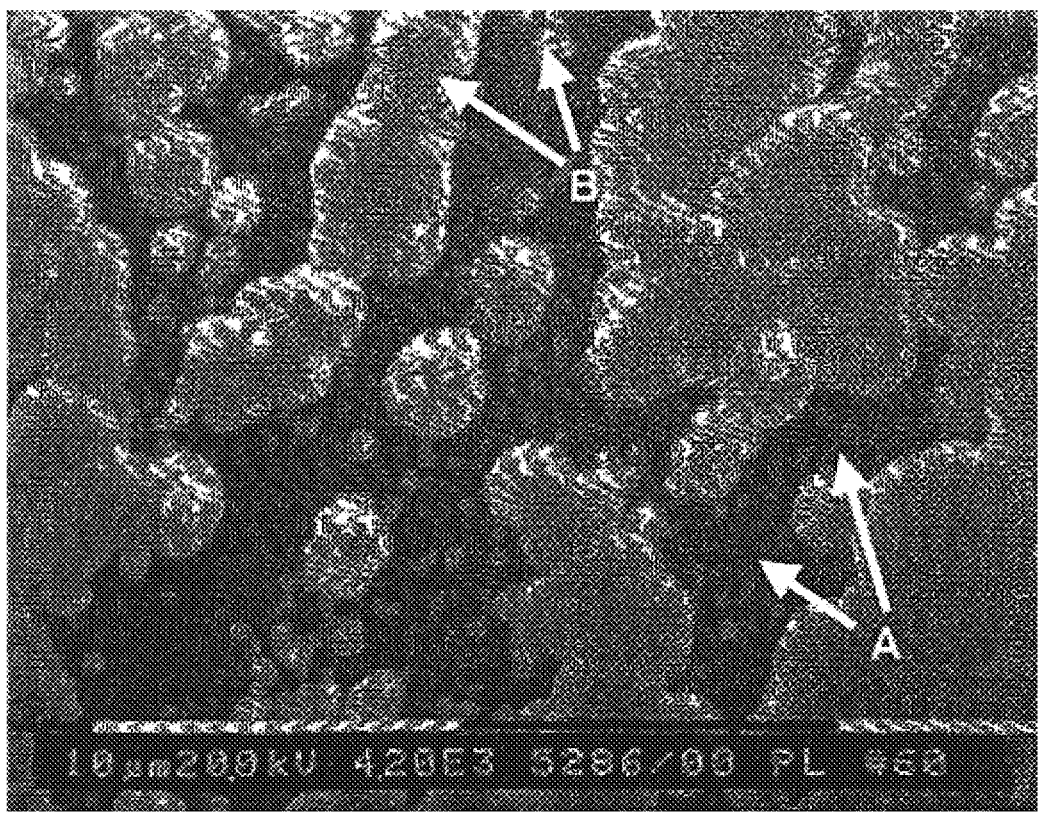
FIG. 5 is a magnified view of FIG. 4.
Figure 6:
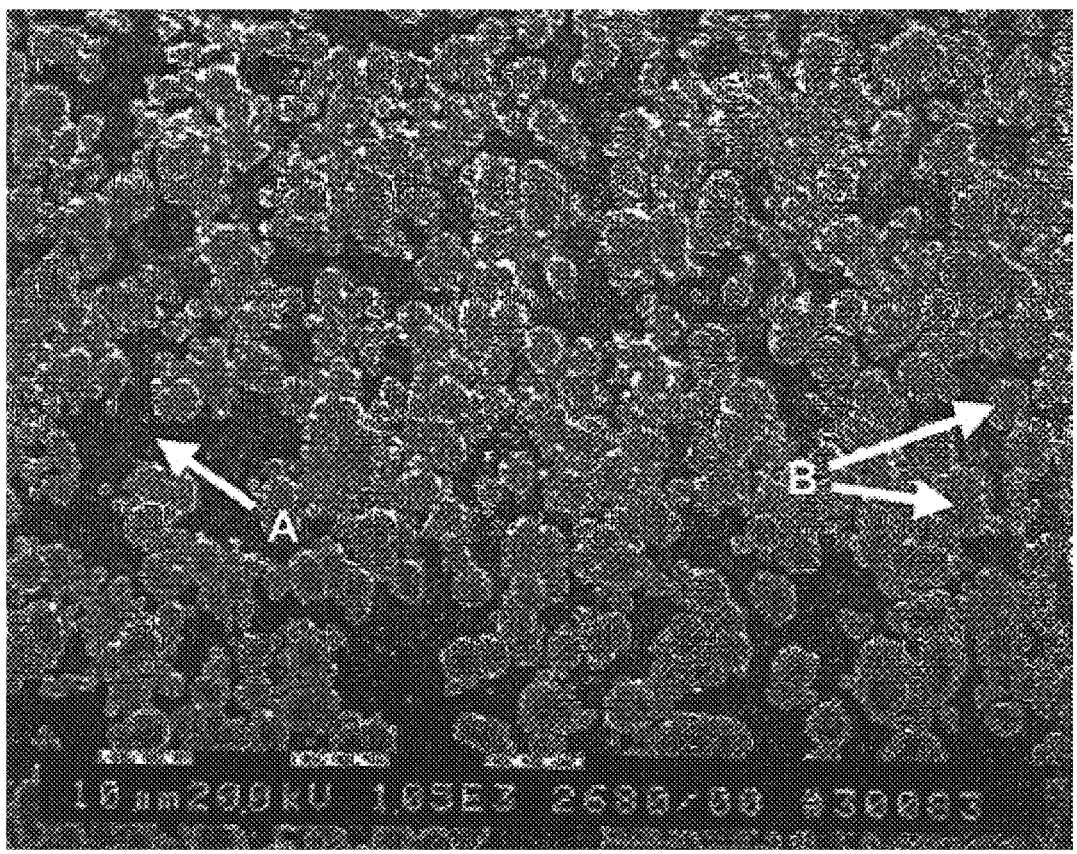
FIG. 6 is an SEM image of the surface of a brazing sheet subsequent to nickel plating in the absence of brush cleaning.

This increased ability is evident upon a comparison of FIGS. 4 and 6, which show, respectively, nickel deposits following brush cleaning, and in the absence of brush cleaning. The nickel deposits in the absence of brush cleaning, indicated by arrow B in FIG. 6, are clearly distributed in an irregular pattern across the surface of the substrate, indicated by arrow A, which pattern mirrors the location of silicon particles at or near the surface, which tend to promote nucleation of nickel. Complete coverage of the aluminum surface by the nickel is somewhat limited, in that nucleation of new Ni nodules in the bare aluminum surface regions is more difficult in comparison to preferential nucleation on the silicon particles. In contrast, the pattern of nickel deposit following brush cleaning is in an even, striated pattern, which follows the bristle direction. This striated surface fosters improved nucleation of the plated deposit, leading to improved coverage as well as increased nucleation rate. In FIG. 5, for example, it is observed that fine Ni nodules continue to grow in the striation regions even as larger nodules continue to grow. It is speculated that this more even distribution is resultant both from the presence of the reentrant edges, indicated by arrows A in FIGS. 4 and 5, which serve to lessen the likelihood that nucleated metals, indicated by arrow B in FIG. 5, will be dislodged, to reenter the solution, and, particularly in the case of nickel, from a tendency of the bristles to mottle the aluminum substrate but not substantially expose silicon particles, thereby lessening the likelihood that they will preferentially attract nickel. In the context of nickel-lead deposition, it is believed that this phenomena is even more pronounced, having regard to the ability of lead to plate preferentially as compared to nickel. Particularly, it has been established by Auger surface analysis that, upon immersion of uncoated aluminum into a plating bath of the type described in U.S. Pat. No. 4,028,200, the initial deposit has a relatively high concentration of lead or bismuth. That is, to a certain extent, the U.S. Pat. No. 4,028,200 process plates as well as it does because it provides for its own "lead preplate" during the initial stages of plating. It therefore follows that a mechanical abrasion should improve plating speed of nickel-lead deposition, given that the initial, difficult nucleation step, that is, the "lead preplate" step, is itself expedited by mechanical abrasion.

In circumstances wherein the nickel is not intended to be plated directly on the aluminum substrate, it has been found that utilization of the plating process described in U.S. Pat. No. 4,208,200, which incorporates a generally alkaline bath, remains a viable option. The usefulness of this process in applying, on a zinc (tin, lead, etc.) coated aluminum substrate, a nickel-lead layer that is amenable to fluxless brazing, is evidenced by the following:

EXAMPLE 16

A coupon was caustic cleaned for 45 seconds; tap water rinsed; and deoxidized in Oakite L25 for 10 seconds; tap water rinsed; and then immersed in a zinc displacement solution including 25% sodium hydroxide, 5% zinc oxide, for 10 seconds, at ambient temperatures, to achieve a uniform zinc coating and nickel plated in a 35C solution including 70 $\mu$l $NiSO_4.6H_2O$, 30 g/l $NiCl_2.6H_2O$, 120 g/l sodium citrate, 20 g/l sodium acetate, 15 g/l $(NH_4)_2SO_4$ [pH 8.2, by 18 Be $NH_4OH$] at 25 mA/cm$^2$ for 120 seconds. The tube was not treated prior to arrangement on the coupon. A fair braze was observed.

EXAMPLE 17

A coupon was was caustic cleaned for 45 seconds; tap water rinsed; and deoxidized in Oakite L25 for 10 seconds; tap water rinsed; immersed in a zinc displacement solution including 25% sodium hydroxide, 5% zinc oxide, for 10 seconds, at ambient temperatures, to a uniform zinc coating; and nickel plated in a 35C solution including 70 g/l $NiSO_4.6H_2O$, 30 g/l $NiCl_2.6H_2O$, 120 g/l sodium citrate, 20 g/l sodium acetate, 15 g/l $(NH_4)_2SO_4$ and 1.2 g/l lead acetate [pH 8.2, by 18 Be $NH_4OH$] at 25 mA/cm$^2$ for 120 seconds. The tube was not treated prior to arrangement on the coupon. An excellent braze was observed.

EXAMPLE 18

A coupon was etched in a 10% caustic, 1% sodium gluconate solution for 45 seconds; tap water rinsed; and immersed in a solution including 250 g/l sodium hydroxide, 4 g/l sodium gluconate, 2.5 g/l Bi203 for 20 seconds, at ambient temperatures, to a uniform zinc coating; and nickel plated in a 35C solution including 70 g/l $NiSO_4.6H_2O$, 30 g/l $NiCl_2.6H_2O$, 120 g/l sodium citrate, 20 g/l sodium acetate, 15 g/l $(NH_4)_2SO_4$ [pH 8.2, by 18 Be $NH_4OH$] at 25 mA/cm$^2$ for 120 seconds. The tube was not treated prior to arrangement on the coupon. An excellent braze was observed.

Of course, in circumstances wherein the bonding layer is lead, bismuth or thallium, the need for further lead in the braze-promoting layer is not present, such that lead can be omitted from the Dockus bath.

However, the invention also encompasses a novel plating process which provides for a functional braze-promoting layer. As one aspect, whereas U.S. Pat. No. 4,208,200 contemplates usefulness only in alkaline conditions [pH 7–12], with resultant production of offensive ammonia vapors, the bath of the present invention may be utilized also in acid conditions [pH 5–7], wherein ammonia vapors are reduced. [So as to avoid corrosion of the aluminum substrate, and improve adhesion of the braze-promoting layer, a preplate (ie. of zinc, tin, lead, bismuth, etc.) is advantageously provided in acid conditions. The preplate may be provided, but is not necessary, in alkaline conditions.] The process is characterized by an aqueous bath comprising, in solution, one or more of nickel, iron and cobalt, along with acetates and gluconates. As one aspect, the bath is characterized by a pH range, as aforesaid, between 5–7. As another aspect, citrate and ammonium are provided in solution, and the mole ratio of nickel:citrate:ammonium in solution is about 1:0.5–1.5:1–6, which provides significant improvements in plating rates and bath life over the process described in U.S. Pat. No. 4,208,200. Preferred embodiments of the above bath are characterized in Table 1, wherein same are identified as solutions 1–7.

For the purpose of understanding Table 1, it should be understood that the values for bath life indicated were obtained using an accelerate life span test method. The method utilizes a nickel anode and aluminum cathode in a beaker containing 500–1000 ml of plating solution. Plating tests were run continuously using a stirred 800 ml plating solution for about 8 hours per day. Periodically small samples were plated for about 1 minute and then brazed in a furnace under nitrogen atmosphere at 1120° F. for 1 minute. Plating of nickel/lead on the aluminum continued each day until either a precipitate formed or a green gel formed on the anode.

TABLE 1

| Formula (grams/liter) | U.S. Pat. No. 4,028,200 | Solutions | | | | | |
|---|---|---|---|---|---|---|---|
| | | 1 | 2 | 3 | 4 | 5 | 6 |
| $NiSO_4.6H_2O$ | 70 | 70 | 70 | | | | |
| $NiCl_2.6H_2O$ | 30 | 30 | 30 | 155 | 150 | 155 | |
| $Na_3$ Citrate.$2H_2O$ | 120 | 120 | 120 | 110 | 200 | 110 | |
| Na Acetate.$3H_2O$ | | 20 | 20 | | | | |
| $(NH_4)_2SO_4$ | | 15 | | | | | |

TABLE 1-continued

| Formula (grams/liter) | U.S. Pat. No. 4,028,200 | 1 | 2 | 3 | 4 | 5 | 6 |
|---|---|---|---|---|---|---|---|
| $NH_4Cl$ | | | 50 | 100 | 20 | 100 | 155 |
| $NH_4OH$ (ml 29%) | 30 | 30 | 30 | 146 | | 146 | |
| Lead Acetate | 1 | 1 | 1 | 1 | 1 | 1 | 1 |
| NaOH (ml 25%) | | | | | 30 | | 93 |
| EDTA | | | | | | | 154 |
| Na Gluconate | | | | | | 66 | |
| Solution pH | 8.1 | 8.1 | 7.8 | 7.8 | 7.6 | 7.8 | 6.4 |
| Bath Life (hours) | 4 | 12 | 50 | 95 | 50 | 187 | 100 |
| Plating Current $mA/cm^2$ | 20 | 20 | 30 | 80 | 30 | 80 | |

As will be evident from a review of Table 1, each of the baths 1–7 provide significant improvements, either in deposition rate or bath life, or both, as compared to the bath described in U.S. Pat. No. 4,028,200. The chemical compositional limits identified in this patent have been shown to be limiting. Particularly, higher levels of acetate or chloride can be used than the respective limits of 10 g/l and 100 µl described. In addition, EDTA and gluconate have been shown to be advantageous as lead and nickel complexing agents, and bath complexing agents. Further, solutions not containing citrate have been shown to be effective.

Without intending to be bound by theory, it is speculated that the improvements relate to preferred ratios of the components in the bath which provide for an equilibrium condition that is conducive to plating reactions, and less favourable to degratation of the bath. Particularly, it is believed that the baths of the present invention provide quantities of citrate sufficient to permit ready complexing of nickel dissolved from the anode, so as to substantially avoid passivation of the anode and precipitation of the newly dissolved nickel ions. Hydroxyl and sulfate ions are particularly deleterious in this regard since they carry a negative charge and are attracted by the anode. Plating efficiency and bath life are adversely affected by anode passivation. It should be noted that chlorides break down the passive layers and depolarize the anodes. Previously it was shown that citrate can be replaced by other strong complexing agents for nickel, however, there is some degradation in plating performance resulting from the tendency for such complexing agents to bind the nickel too tightly to participate in the plating reaction. It is also believed that the baths of the present invention provide quantities of ammonia sufficient to permit ready complexing of the nickel presented to the cathode. Ammoniacal nickel carries a positive charge due to the neutral charge of the ammonia molecule, regardless of the complex number. The positive charge of the ammoniacal nickel allows free and rapid transfer of the nickel to the negatively charged electrode surface. Ammonia then plays a second and crucial role of buffering the electrode surface as it is discharged from the complexed nickel molecule. The release of ammonia in part can form a gaseous phase which tends to detach and scrub the surface, especially of hydrogen gas bubbles, allowing rapid reintroduction of complexed nickel to the surface. As well, ammonia buffers the surface environ such that hydroxyl ions generated through parasitic evolution of hydrogen cannot affect the quality of the nickel deposit. Recall that an abundance of hydroxyl ions can cause irreversible precipitation of the nickel species, resulting in decreased bath life, and codeposition of a hydrated nickel species that can adversely affect braze quality. It is well known that complexing agents are used to increase the solubility of a plated species. The strong complexing ability of citrate and ammonia for nickel increases and stabilizes the high nickel contents in the bath. However, it is further believed that the baths of the present invention present nickel bath formulations with citrate and ammonia that allow for suitably rapid transfer of complexing species from citrate, which predominates in the anodic boundary layer, to ammonia, which predominates in the cathodic boundary layer. The transfer occurs spontaneously in the bulk solution as the chemical system drives towards equilibrium. If the kinetics of the swapping reaction are rate-limiting the bath could suffer degradation. Alkaline baths suffer slightly due to the presence of dissolved gaseous ammonia which can volatize into the local air stream. The hazardous fumes can cause irritation and burning of mucous membranes and therefore require specialized containment and exhaust systems. Addition of a wetting agent including, but not limited to, lead, significantly improves the plating and brazing reactions in alkaline or mildly acidic solutions, and the brazing reactions in deposits obtained from more acid solutions. In alkaline or mildly acid solutions, lead is added as a soluble acetate species but is strongly complexed by citrate. The citrate stabilizes the lead ion in the bulk solution, presents the lead to the cathodic surface and effectively buffers the lead from precipitation with low solubility anions including, and predominantly, hydroxyl ion, as well as sulfate and chloride species during plating. The preferential plating of lead, bismuth, etc. or the purposeful deposition of lead nickel as a prestrike can increase the nucleation of nickel and therefore increase the coverage. This has far reaching implications allowing for decreased nickel consumption and an enhancement of braze quality and joint durability.

As previously indicated, it is known to utilize the Watts bath to provide a decorative nickel coating on aluminum. Utilization of the conventional Watts bath would overcome the problem of ammonia release, since inter alia the Watts bath contains no ammonia. However, it is conventional to utilize copper as a preplate; zinc is also known as a possibility, but the Watts bath is known to be difficult to control in the context of a zinc-coated aluminum substrate, and moreover, is not amenable to the inclusion of lead, bismuth or thallium, which can reduce plating rate. These difficulties of the conventional Watts bath are demonstrated with reference to the following examples.

EXAMPLE 19

A Watts bath was prepared, utilizing 200 µl $NiSO_4.6H_2O$, 40 gl/l $NiCl_2.6H_2O$, 30 gl/l $H_3BO_3$, pH 4.8–5.2. A coupon of 0.020"#12 brazing sheet, zincated as received for 30 s at ambient temperature (to a uniform zinc coating) was immersed in the bath and subjected to a current density of 50 mA/cm². Black streaks and edge burning were noticeable after 60 seconds, and no uniform nickel coating was obtained. Braze quality was fair to poor.

Since it is desirable to produce a bath that does not release ammonia fumes, it is counter-intuitive to incorporate ammonia into a Watts bath. However, it is evident that the aforementioned discovery of the particular advantages provided by ammonium in nickel plating, and the preferable mole ratios to achieve equilibrium, have inherent application also in acidic conditions. Thus, the invention also comprises an improved Watts-type process that is robust for use with coated aluminum substrates and amenable to the incorporation into the plate of lead, bismuth or thallium, where said elements are not present in sufficient quantities in the coating to effectively serve as wetting agents in the braze. The improved process is characterized by an aqueous bath comprising nickel and ammonium in solution, and an acid sufficient to adjust the pH of such bath to acidic conditions, preferably, between about 3–7. Preferably, the acid is based on either or both of the anions of the nickel and ammonium in solution. A strong nickel chelating agent is also preferably provided, such as citrate and optionally EDTA. Advantageously, acetate and/or gluconate will be present to complex wetting agents such as bismuth and lead. The acidic conditions result in the predominance of ammonium ions in solution. The presentation of ammonium ions with soluble hydrated nickel can shift the equilibrium making ammoniacal nickel available to the cathodic surface and as shown in the alkaline baths, results in improved plating kinetics and bath life. Regardless of the presence of a highly acidic bulk solution, the buffering effect is enhanced at the cathode surface, reducing the propensity for hydroxide formation. Acid solutions can be prone to parasitic formation of hydrogen and the ammonia can effectively reduce the rate of hydrogen evolution by displacement from the surface of the cathode of the hydrogen proton and water. Citrate incrementally improves the nature of the nickel and/or nickel-lead deposit, even in small quantities, by stabilizing these species in the acidic environ. Particular embodiments are described in the following examples, the usefulness of which will be evident.

EXAMPLE 20

A first modified Watts bath was prepared, utilizing 150 g/l $NiSO_4 \cdot 6H_2O$, 30 g/l $NH_4Cl$, 30 g/l $H_3BO_3$, lead acetate 1 g/l, pH 4.8–5.2 by concentrated $H_2SO_4$. A coupon of 0.020" #12 brazing sheet, zincated as received for 30 s at ambient temperature (to a uniform zinc coating) was immersed in the bath and subjected to a current density of 50 mA/cm² for 60–90 s. Following plating, the coupon was brazed against a 3003 tube. Brazing peak temperature was 1100° F. and an excellent brazing joint was obtained. A cloudy bath was observed which indicated lead precipitation.

EXAMPLE 21

A second modified Watts bath was prepared, utilizing 100 μl $NiSO_4 \cdot 6H_2O$, 70 g/l sodium citrate, 30 g/l $NH_4Cl$, lead acetate 1 g/l, pH 3.2–6.2 by concentrated $H_2SO_4$, acetic acid or HCl. A coupon of 0.020" #12 brazing sheet, zincated as received for 30 s at ambient temperature (to a uniform zinc coating) was immersed in the bath and subjected to a current density of 50 mA/cm² for 60 s. Following plating, the coupon was brazed with 3003 tube. Brazing peak temperature was 1100° F. and an excellent brazing joint was obtained. The bath remained clear.

As per the work of Dockus in U.S. Pat. No. 4,028,200, it is known that the thickness of the braze-promoting layer is preferably about 0.1 to about 2.5% of the total thickness of the combination of the clad layer and the braze-promoting layer, for thin gauges such as those use commonly in heat exchanger construction [0.4 mm–0.75 mm]. If the amount of braze-promoter, such as nickel is deficient, the exothermic reaction will release insufficient heat to disrupt the oxide layer; if the amount is too large, it will react with the aluminum to form an excessive amount of aluminide compound, which is deleterious to bond formation and particularly, quality.

It has heretofore been understood that, provided uniform coverage was obtained, the thinnest zincate deposit possible was advantageous. However, such teachings were in the context of the plating of decorative nickel, and not in the context of braze-promoting nickel. It has been found, for bonding of a braze-promoting layer according to the present invention, the bonding layer should have a thickness of not more than 1 μm, preferably not more than 0.3 μm, and the braze-promoting layer should have a thickness of not more than 2.0 μm, preferably not more than 1.0 μm, again, for clad aluminum of the gauges generally utilized in the construction of heat exchangers.

It has also been found advantageous to incorporate certain alloying elements into the core, cladding or bonding or braze-promoting layers, as follows:

| | |
|---|---|
| Th | in the range 0.01 to 1.0% by weight |
| Bi | in the range 0.01 to 1.0% by weight |
| Mg | in the range 0.05 to 3.0% by weight |
| Li | in the range 0.01 to 0.5% by weight |
| Pb | in the range 0.01 to 1.0% by weight |

As previously indicated, Th, Bi and Pb are wetting agents, which improve the quality of the braze joint when incorporated in the cladding, or in the bonding layer or braze-promoting layer as taught herein. Mg and Li are known to enhance the braze and may be readily alloyed in the brazing sheet. Mg is of specific interest in the nickel braze reaction due to the probable volatization, even at approximately atmospheric pressures, and resultant enhanced disintegration of the oxide layer during or close in timing to the nickel reaction. The nickel will tend to delay oxidation or relase of the MG through the aluminum oxide on the braze alloy surface until the point of reaction. The nickel reaction tends to occur quickly at the instance of first melting of the clad surface, especially due to the heat generated in the localized exothermic reaction of nickel and aluminum. If residual sites of poorly broken oxides persist, the Mg volatization can additionally and compoundly break down these persistent oxides resulting in improved joint formation. Li is known to reduce to the surface tension of molten aluminum which may beneficially affect the braze reaction and subsequent fillet formation during nickel reaction and Mg volatization.

Indeed, testing has established that, in brazing sheet incorporating a nickel-lead braze-promoting layer as per the present invention, the intentional incorporation of about 0.15–0.2 wt. % Mg in the cladding resulted in a 50–70° F. drop in the threshold temperature necessary to achieve satisfactory brazing. Incorporation of about 0.05% lithium resulted in a further 60–80° F. decrease.

As previously discussed, the bonding layer can consist entirely of zinc, tin, lead, bismuth, nickel, antimony and thallium, or combinations thereof. As such, the bonding layer can be a codeposit of, for example, zinc with lead, bismuth or thallium, or nickel with lead, bismuth or thallium, or zinc with nickel, or tin with nickel. Thus, as one aspect of the invention, it is contemplated that the bonding layer itself will contain by weight an amount not more than 50% in total of one or more elements selected from bismuth, lead, thallium and antimony, balance zinc or tin. The following example is illustrative.

EXAMPLE 22

Part 1 was immersed in (100 g/l sodium hydroxide, 50 g/l sodium potassium tartrate, 2 g/l iron chloride, 1 µl sodium nitrate, 10 g/l ZnO, 2–3 g/l Bi2O3) for 10–20 s at ambient. Folowed by water rinsing, thence, nickel plating for 2 min at 25 mA/sq.cm LNG (70 nickel sulphate, 30 nickel chloride, 120 sodium citrate, 20 gl sodium acetate, 15 ammonium sulphate, 30 ml ammonium hydroxide ph 8.1). Excellent brazing.

In the event that corrosion properties of the clad layer are desired to be modified, it is contemplated that the clad layer may contain by weight Zn in an amount in the range of up to about 5%. Manganese or other functional alloying ingredients may also be included in the clad layer as typical in commercial brazing sheet.

Figure 7:
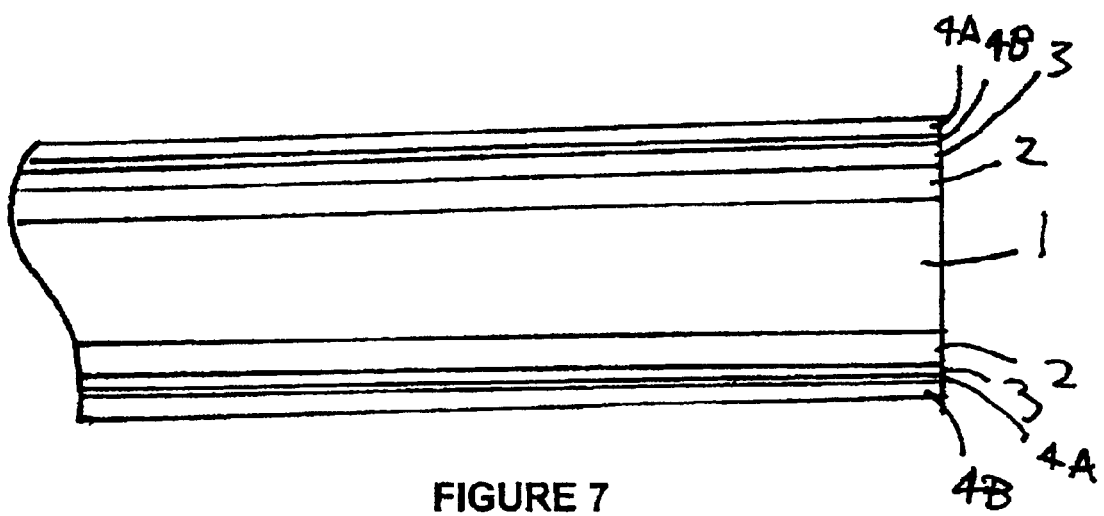
FIG. 7 is a brazing sheet according to an alternate preferred embodiment of the present invention.

It will be evident that various modifications to the foregoing may be effected. As described in the previous examples, it is possible, for example, to utilize a bonding layer of lead (or bismuth), and a braze-promoting layer of nickel. In this case, the bonding layer serves the dual purpose of facilitating adherence, and acting as a wetting agent. It is also possible to codeposit nickel and lead as a bonding layer, and then follow that deposit by nickel, again, for similar purpose. A preferable variation, however, illustrated schematically in FIG. 7, involves the use of a zinc (or tin) bonding layer 3, followed by a duplex layer which comprises an inner layer 4A including nickel and lead (or nickel and bismuth) and an outer layer 4B including nickel. By this variation, the bonding layer provides a good surface for nucleation for the following layers; the inner layer provides a desirable wetting agent, with nickel; and the outer layer provides the desirable braze-promoting metal, nickel, which can be applied in a high build bath without the need to accomodate lead, which as previously discussed, can complicate bath chemistry. Indeed, the "inner" and "outer" layers may wish to be reversed, such that the wetting agent is coated last, if, which might avoid the potential for cross-contamination.

Finally, it is to be understood that while but four preferred embodiments, in the nature of articles of manufacture, have been herein shown and described, many variants in, inter alia, size and shape of parts may be made within departing from the spirit or scope of the invention. Similarly, while it is to be understood that while but nine embodiments of the plating baths of the present invention have been herein shown and described, many variants in, inter alia, process characteristics may be made without departing from the spirit or scope of the invention. As well, while the disclosure is directed primarily to heat exchanger construction, it will be evident that the teachings of the present invention have broader application, and may be usefully practised, for example, in the construction of many structures and devices. Accordingly, the scope of the invention is limited only by the claims appended hereto, purposively construed.

What is claimed is:

1. An article of manufacture for use in a fluxless brazing process, the article of manufacture comprising:
   (a) a substrate comprising aluminum or an aluminum alloy;
   (b) a bonding layer provided on the substrate, the bonding layer consisting of one or more metals selected from nickel, lead, bismuth, antimony and thallium; and
   (c) a braze-promoting layer on the bonding layer, the braze-promoting layer comprising one or more metals selected from nickel, cobalt and iron.

2. An article of manufacture according to claim 1, wherein the substrate comprises a core layer and a clad layer formed of aluminum or an aluminum alloy, and wherein the bonding layer is disposed on the clad layer.

3. An article of manufacture according to claim 2, comprising a brazing product selected from a brazing sheet and a brazing preform, wherein the core layer is comprised of aluminum or an aluminum alloy.

4. An article of manufacture according to claim 2, wherein the clad layer comprises an aluminum alloy containing aluminum and one or more alloying elements selected from silicon, magnesium, zinc and manganese.

5. An article of manufacture according to claim 4, wherein the clad layer comprises an aluminum brazing alloy comprising aluminum and 2–18% silicon.

6. An article of manufacture according to claim 1, comprising a brazing preform, wherein the substrate comprises an aluminum brazing alloy, the aluminum brazing alloy comprising aluminum and 2–18% silicon.

7. An article of manufacture according to claim 1, wherein the braze-promoting layer comprises nickel.

8. An article of manufacture according to claim 1, wherein the braze-promoting layer comprises nickel in combination with one or more metals selected from the group consisting of lead, bismuth, magnesium, lithium and thallium.

9. An article of manufacture according to claim 1, wherein the braze-promoting layer comprises nickel and lead.

10. An article of manufacture according to claim 1, wherein the braze-promoting layer comprises nickel and bismuth.

11. An article of manufacture according to claim 1, wherein the braze-promoting layer has a thickness of not more than about 2.0 µm.

12. An article of manufacture according to claim 1, wherein the braze-promoting layer has a thickness of between 0.5 and 1.0 µm.

13. An article of manufacture according to claim 1, wherein the bonding layer comprises lead.

14. An article of manufacture according to claim 1, wherein the bonding layer comprises bismuth.

15. An article of manufacture according to claim 1, wherein the bonding layer comprises antimony.

16. An article of manufacture according to claim 1, wherein the bonding layer comprises nickel.

17. An article of manufacture according to claim 1, wherein the bonding layer comprises a codeposit of nickel with lead, bismuth or thallium.

18. An article of manufacture according to claim 1, wherein the bonding layer has a thickness of not more than 0.5 µm.

19. An article of manufacture according to claim 1, wherein the bonding layer has a thickness of not more than 0.3 µm.

20. An article of manufacture for use in a fluxless brazing process, the article of manufacture comprising:
   (a) a substrate comprising aluminum or an aluminum alloy;
   (b) a bonding layer provided on the substrate, the bonding layer comprises nickel in combination with one or more metals selected from lead, bismuth, antimony, thallium, tin and zinc; and (c) a braze-promoting layer on the bonding layer, the braze-promoting layer comprising one or more metals selected from nickel, cobalt and iron.

21. An article of manufacture according to claim 20, wherein the bonding layer comprises a codeposit of zinc with nickel.

22. An article of manufacture according to claim 20, wherein the bonding layer comprises a codeposit of tin with nickel.

23. An article of manufacture for use in a fluxless brazing process, the article of manufacture comprising:
(a) a substrate comprising aluminum;
(b) a bonding layer provided on the substrate, the bonding layer comprising one or more metals selected from the group consisting of nickel, lead, bismuth, antimony, thallium, zinc and tin;
(c) an inner braze-promoting layer provided on the bonding layer, the inner braze-promoting layer comprising one or more metals selected from the group consisting of nickel, cobalt and iron; and
(d) an outer braze-promoting layer provided on the inner braze-promoting layer, the outer braze-promoting layer comprising one or more metals selected from the group consisting of nickel, cobalt and iron.

24. An article of manufacture according to claim 23, wherein the substrate comprises a core layer and a clad layer formed of aluminum or an aluminum alloy, and wherein the bonding layer is disposed on the clad layer.

25. An article of manufacture according to claim 24, comprising a brazing product selected from a brazing sheet and a brazing preform, wherein the core layer is comprised of aluminum or an aluminum alloy.

26. An article of manufacture according to claim 24, wherein the clad layer comprises an aluminum alloy containing aluminum and one or more alloying elements selected from silicon, magnesium, zinc and manganese.

27. An article of manufacture according to claim 24, wherein the clad layer comprises an aluminum brazing alloy comprising aluminum and 2–18% silicon.

28. An article of manufacture according to claim 23, comprising a brazing preform, wherein the substrate comprises an aluminum brazing alloy, the aluminum brazing alloy comprising aluminum and 2–18% silicon.

29. An article of manufacture according to claim 23, wherein each of the inner and outer braze-promoting layers comprises nickel.

30. An article of manufacture according to claim 23, wherein each of the inner and outer braze-promoting layers comprises nickel in combination with one or more metals selected from the group consisting of lead, bismuth, magnesium, lithium and thallium.

31. An article of manufacture according to claim 23, wherein the inner braze-promoting layer comprises nickel and lead, and the outer braze-promoting layer comprises nickel.

32. An article of manufacture according to claim 23, wherein the inner braze-promoting layer comprises nickel and bismuth, and the outer braze-promoting layer comprises nickel.

33. An article of manufacture according to claim 23, wherein the inner braze-promoting layer comprises nickel, and the outer braze-promoting layer comprises nickel and lead.

34. An article of manufacture according to claim 23, wherein the inner braze-promoting layer comprises nickel, and the outer braze-promoting layer comprises nickel and bismuth.

35. An article of manufacture according to claim 23, wherein the inner and outer braze-promoting layers have a combined thickness of not more than about 2.0 $\mu$m.

36. An article of manufacture according to claim 23, wherein the inner and outer braze-promoting layers have a combined thickness of between 0.5 and 1.0 $\mu$m.

37. An article of manufacture according to claim 23, wherein the bonding layer is comprised of at least 50% by weight of a metal selected from the group consisting of zinc and tin.

38. An article of manufacture according to claim 23, wherein the bonding layer comprises lead.

39. An article of manufacture according to claim 23, wherein the bonding layer comprises bismuth.

40. An article of manufacture according to claim 23, wherein the bonding layer comprises antimony.

41. An article of manufacture according to claim 23, wherein the bonding layer comprises nickel.

42. An article of manufacture according to claim 41, wherein the bonding layer further comprises one or more metals selected from the group consisting of lead, bismuth, antimony, tin and zinc.

43. An article of manufacture according to claim 23, wherein the bonding layer comprises a codeposit of nickel with lead, bismuth or thallium.

44. An article of manufacture according to claim 23, wherein the bonding layer comprises a codeposit of zinc with nickel.

45. An article of manufacture according to claim 23, wherein the bonding layer comprises a codeposit of tin with nickel.

46. An article of manufacture according to claim 23, wherein the bonding layer comprises a codeposit of zinc with lead, bismuth or thallium.

47. An article of manufacture according to claim 23, wherein the bonding layer has a thickness of not more than 0.5 $\mu$m.

48. An article of manufacture according to claim 23, wherein the bonding layer has a thickness of not more than 0.3 $\mu$m.

49. A method of manufacturing an assembly of components joined by brazing, the method comprising:
(a) providing a first component comprised of aluminum, aluminized metal, nickel-coated titanium, nickel-coated steel or steel;
(b) providing a second component comprised of aluminum, aluminized metal, nickel-coated titanium, nickel-coated steel or steel;
(c) providing a third component comprising an article of manufacture according to claim
(d) combining said components to provide said assembly;
(e) brazing the assembly in a non-oxidizing environment in the absence of a brazing flux at elevated temperature for a period long enough for brazing to occur; and
(f) cooling the assembly.

50. A method according to claim 49, wherein the substrate of the article of manufacture comprises a core layer and a clad layer formed of aluminum or an aluminum alloy, and wherein the bonding layer is disposed on the clad layer.

51. A method according to claim 50, wherein the article of manufacture comprises a brazing product selected from a brazing sheet and a brazing preform, wherein the core layer is comprised of aluminum or an aluminum alloy.

52. A method according to claim 50, wherein the clad layer of the article of manufacture comprises an aluminum alloy containing aluminum and one or more alloying elements selected from silicon, magnesium, zinc and manganese.

53. A method according to claim 50, wherein the clad layer of the article of manufacture comprises an aluminum brazing alloy comprising aluminum and 2–18% silicon.

54. A method according to claim 49, wherein the article of manufacture comprises a brazing preform and wherein the substrate comprises an aluminum brazing alloy comprising aluminum and 2–18% silicon.

55. A method of manufacturing an assembly of components joined by brazing, the method comprising:
   (a) providing a first component comprised of aluminum, aluminized metal, nickel-coated titanium, nickel-coated steel or steel;
   (b) providing a second component comprised of aluminum, aluminized metal, nickel-coated titanium, nickel-coated steel or steel;
   (c) providing a third component comprising an article of manufacture according to claim
   (d) combining said components to provide said assembly;
   (e) brazing the assembly in a non-oxidizing environment in the absence of a brazing flux at elevated temperature for a period long enough for brazing to occur; and
   (f) cooling the assembly.

56. A method according to claim 55, wherein the substrate of the article of manufacture comprises a core layer and a clad layer formed of aluminum or an aluminum alloy, and wherein the bonding layer is disposed on the clad layer.

57. A method according to claim 56, wherein the article of manufacture comprises a brazing product selected from a brazing sheet and a brazing preform, wherein the core layer is comprised of aluminum or an aluminum alloy.

58. A method according to claim 56, wherein the clad layer of the article of manufacture comprises an aluminum alloy containing aluminum and one or more alloying elements selected from silicon, magnesium, zinc and manganese.

59. A method according to claim 56, wherein the clad layer of the article of manufacture comprises an aluminum brazing alloy comprising aluminum and 2–18% silicon.

60. A method according to claim 55, wherein the article fo manufacture comprises a brazing preform and wherein the substrate comprises an aluminum brazing alloy comprising aluminum and 2–18% silicon.

* * * * *

UNITED STATES PATENT AND TRADEMARK OFFICE
CERTIFICATE OF CORRECTION

PATENT NO. : 6,815,086 B2
DATED : November 9, 2004
INVENTOR(S) : Dockus et al.

It is certified that error appears in the above-identified patent and that said Letters Patent is hereby corrected as shown below:

Column 18,
Line 49, after "claim" add -- 1; --;

Column 19,
Line 17, after "claim" add -- 23; --;

Column 20,
Line 18, replace "fo" by -- of --.

Signed and Sealed this

Tenth Day of May, 2005

JON W. DUDAS
*Director of the United States Patent and Trademark Office*